3,428,593
HIGH EFFICIENCY STABLE LIQUID PHENOL-FORMALDEHYDE RESIN

Harold P. Higginbottom and John R. Le Blanc, Wilbraham, Mass., assignors to Monsanto Company, St. Louis, Mo., a corporation of Delaware
No Drawing. Filed June 2, 1965, Ser. No. 460,825
U.S. Cl. 260—29.3  6 Claims
Int. Cl. C08g 5/06

ABSTRACT OF THE DISCLOSURE

Stable, high efficiency, single phase, aqueous phenol-formaldehyde resins and process for making same by reacting phenol and formaldehyde under controlled reaction conditions and a controlled excess of free formaldehyde.

---

This invention is directed to a stable high efficiency single phase aqueous phenol-formaldehyde resin and to a process for preparing the high efficiency resin.

A high efficiency single phase aqueous phenol-formaldehyde resin is one which has low free phenol and low saligenin (ortho-hydroxy benzyl alcohol) and can be aptly described as one which has an applied resin solids to measured resin solids ratio of at least 0.87. Free phenol and saligenin volatize off during curing of the resin. As such, it reduces the efficiency of the resin and thus its performance in various bonding applications. A high efficiency resin is extremely valuable to the industry since it results in a greater economic advantage over conventional resins. Even more important is the increase in performance of the resin bonding applications. However, one of the unfortunate drawbacks with a high efficiency single phase aqueous phenol-formaldehyde resin is the instability of the resin which results in the formation of a solid or crystal phase. This crystal phase is extremely difficult to redissolve. Heating the resin to elevated temperatures will help to redissolve the crystal phase, but, unfortunately, such exposure to high temperatures will also advance the resin and effect its dilutability characteristics thereby affecting its application performance. Filtering out the crystals would only produce a resin having poor bonding characteristics.

It has now been surprisingly discovered that the crystal phase formation can be prevented and the resin rendered stable by controlling the free formaldehyde content of the liquid phenol-formaldehyde resin.

Therefore, it is an object of this invention to provide a stable high efficiency single phase aqueous phenol-formaldehyde resin.

Another object of this invention is to provide a stable high efficiency single phase aqueous phenol-formaldehyde resin having certain materials in equilibrium which prevents the formation of the crystal phase.

Still another object of this invention is to provide a process for preparing a stable high efficiency single phase aqueous phenol-formaldehyde resin.

Other objects of this invention will in part be obvious and will in part be set out and appear hereinafter.

Briefly, the above and other objects of this invention including the advantages thereof are obtained by preparing a high efficiency single phase aqueous phenol-formaldehyde resin having a free formaldehyde content of at least 3.0 weight percent based on the weight of the phenol-formaldehyde solids. The resin is first prepared by reacting phenol and formaldehyde in certain critical proportions in the presence of a critical proportion of a basic catalyst. The reaction is continued until an end point of less than 5 weight percent of free phenol is obtained based on the weight of the phenol-formaldehyde resin solids. The free formaldehyde content is then adjusted to at least 3.0 weight percent by the post addition of formaldehyde thereto. The addition of this formaldehyde keeps the resin stable by driving the equilibrium reaction of formaldehyde and bis(4-hydroxy-3,5-dihydroxymethylphenyl) methane in the direction of forming at least the mono-hemiformal of bis(4-hydroxy-3,5-dihydroxymethylphenyl) methane. This prevents the formation of crystals of bis(4-hydroxy-3,5-dihydroxymethylphenyl) methane.

The following examples are set forth to illustrate more clearly the principles and practices of this invention to one skilled in the art and they are not intended to be restrictive but merely to be illustrative of the invention herein contained. Unless otherwise stated all parts and percentages are on a weight basis.

Example I

A phenol-formaldehyde aqueous resin is prepared by reacting 2.2 mols of formaldehyde per mol of phenol in the presence of 6 parts of a sodium hydroxide catalyst based on 100 parts of phenol. The reaction is carried out under reflux conditions at 65° C. to a free phenol content of 4.5 weight percent based on the weight of the resin solids. The pH of the resin is 7.5. The resin is analyzed and found to contain about 1.0 weight percent of free formaldehyde based on the weight of resin solids. Additional formaldehyde is then added to adjust the free formaldehyde content to about 5 weight percent based on the weight of resin solids.

Example II

Example I is repeated except that the free formaldehyde content of the resin is not adjusted with additional formaldehyde. The free formaldehyde content is analyzed to be about 1.0 weight percent based on the weight of the resin solids.

Example III

In order to determine the stability of the resin of Examples I and II, separate samples thereof are stored at temperatures of 0° C. and 15° C. respectively. The stability of the samples as determined by the formation of the crystal phase is as follows:

TABLE I

Resin sample:
    Example I:
        0° C. _____ >6 weeks.
        15° C. _____ Do.
    Example II:
        0° C. _____ 3 days.
        15° C. _____ 7 days.

The sample of Example II containing about 1.0 weight percent free formaldehyde exhibited heavy crystal formation after 3 and 7 days at 0° C. and 15° C., respectively, showing poor stability of the high efficiency phenol-formaldehyde resin. With the sample of Example I containing 5 weight percent of free formaldehyde, the stability of the system is excellent with no formation of crystals even after six weeks at the temperatures of 0° C. and 15° C. With the resin sample containing about 1.0 weight percent of free formaldehyde, the heavy crystals are difficult to redissolve even after heating the sample at 40° C. for one-half hour. At the end of this time, there were still crystals remaining.

The invention set forth herein is directed to a stable high efficiency single phase aqueous phenol-formaldehyde resin wherein the resin has a free formaldehyde content of at least 3.0 weight percent and preferably 3.0–10.0 weight percent based on the weight of the phenol-formaldehyde solids. In addition, the resin should have a free phenol content of less than 5 weight percent based on the weight of the phenol-formaldehyde solids and a pH of 6.8–8.2.

The high efficiency resin of this invention contains in equilibrium formaldehyde, bis(4-hydroxy-3,5-dihydroxymethylphenyl)methane and at least the mono-hemiformal of bis(4-hydroxy-3,5-dihydroxymethylphenyl)methane. The equilibrium conditions can best be described by the following chemical equation:

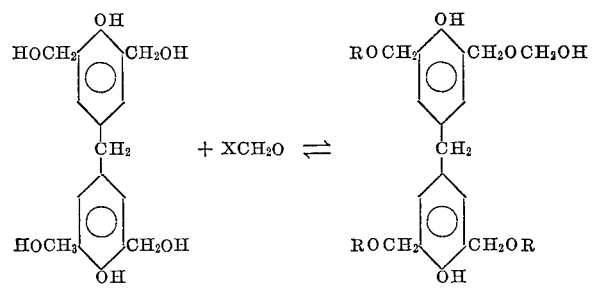

wherein R is independently selected from the group consisting of hydrogen and the methylol radical —$CH_2OH$ and X is an integer from 1–4 depending upon the number of methylol radicals. When the hemiformal is the dihemiformal of bis(4-hydroxy-3,5-dihydroxymethylphenyl)methane containing two —$CH_2OH$ radicals, for example, then X will be 2. When the hemiformal is tetra hemiformal of bis(4-hydroxy-3,5-dihydroxymethylphenyl)methane containing four —$CH_2OH$ radicals, then X will be 4. With the proper amount of formaldehyde, the equilibrium reaction is favored in the direction of forming the hemiformals.

The important and novel feature of this invention is that the free formaldehyde content must be at least 3.0 weight percent in order to maintain the proper equilibrium balance as shown in the above equation so as to prevent formation of a crystal phase. If the free formaldehyde content is too low, crystals of bis(4-hydroxy-3,5-dihydroxymethylphenyl)methane will form resulting in a two phase unstable resin. The examples specifically show that when about 1.0 weight percent of free formaldehyde is present in the resin, a crystal phase forms within a few short days resulting in an unstable resin. On the other hand, when a resin is adjusted to a free formaldehyde content of 5 weight percent by the post addition of formaldehyde, the resin remained a single phase resin without the formation of a crystal phase even after six weeks at severe temperature conditions. In the practice of this invention, the resin must contain at least 3.0 weight percent and preferably 3.0–10.0 weight percent of free formaldehyde based on the weight of resin solids to provide a stable high efficiency single phase aqueous phenol-formaldehyde resin.

In addition, the invention set forth herein is also directed to a process for preparing the stable high efficiency single phase aqueous phenol-formaldehyde resin composition having the proper equilibrium balance of the materials set forth in the previously described chemical equation. The process of this invention consists of reacting 2.0–3.2 mols of formaldehyde per mol of phenol in the presence of at least 5 parts and preferably 5–15 parts of a basic catalyst per 100 parts of phenol. The reaction is continued until a free phenol content of less than 5 weight percent is obtained and to a pH of 6.8–8.2. The free formaldehyde content of the resin is then adjusted to at least 3.0 weight percent based on the weight of resin solids by the post addition of formaldehyde thereto.

Another important and novel feature of the process of this invention is that in order to obtain a stable high efficiency single phase aqueous resin, the above process conditions are essential. To use less than 2.0 mols or more than 3.2 mols of formaldehyde per mol of phenol or if less than 5 parts of catalyst is employed or if the reaction is continued to a point wherein the free phenol is greater than 5 weight percent, the resulting resin would not be a stable high efficiency single phase aqueous phenol-formaldehyde resin wherein the applied resin solids to measured resin solids ratio would be at least 0.87. For example, when preparing a resin by reacting 2.5 mols of formaldehyde per mol of phenol in the presence of 3 parts of sodium hydroxide catalyst to a free phenol end point of 6 weight percent based on the weight of resin solids, the resin has an Owens solids of about 46%. An Owens solids test requires diluting 2 grams of a resin in 10 ml. of methanol and curing the resin at 150° C. for 2 hours. The residue is weighed and the difference between the resin before diluting and after curing is the measured resin solids. The same test conducted on a sample of the resin of Example I results in an Owens solids of about 46%. To determine applied resin solids, a 2 gram sample of a resin is diluted with 20 ml. of water and a film thereof is cast on a glass substrate. The film is cured at 200° C. for 1 hour. The applied resin solids is determined by measuring the sample before diluting and after curing. The applied resin solids obtained on a glass substrate for the resin of Example I is 41.4% and for the resin prepared as described above 36.3%. The efficiency of a resin is then determined by the ratio of applied resin solids to measured resin solids. For the resin of Example I, the efficiency is 0.90 and for the resin prepared in the manner as described above, the efficiency is 0.78. The resin of Example I is then a high efficiency resin. Therefore, the conditions for preparing a high efficiency resin and the post addition of formaldehyde to adjust the free formaldehyde content to at least 3.0 weight percent are important and critical features of the instant invention.

The stable high efficiency single phase aqueous phenol-formaldehyde resin of this invention are extremely stable resin systems even when exposed to cold temperatures. This, therefore, allows the resin to be shipped and stored for long periods of time without detriment to the stability of the resin. Thus the high efficiency of the resin is not affected.

It will thus be seen that the objects set forth above, among those made apparent from the description, are efficiently attained, and since changes may be made in carrying out the above process and in the composition set forth without departing from the scope of this invention, it is intended that all matters contained in the above description shall be interpreted as illustrative and not in a limiting sense.

What is claimed is:

1. A stable high efficiency single phase aqueous phenol-formaldehyde resin having a free formaldehyde content of at least 3.0 weight percent, a free phenol content of less than 5.0 weight percent both based on the weight of the phenol-formaldehyde solids and a pH of 6.8–8.2, and wherein the resin has contained therein in equilibrium formaldehyde, bis(4-hydroxy-3,5-dihydroxymethylphenyl)methane and at least the mono-hemiformal of bis(4- hydroxy-3,5-dihydroxymethylphenyl)methane as set forth in the following chemical equation:

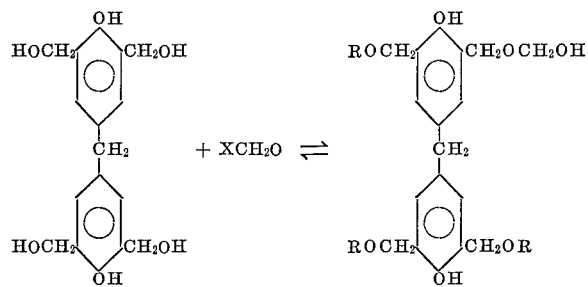

wherein R is independently selected from the group consisting of hydrogen and the methylol radical —$CH_2OH$ and X is an integer from 1–4 depending upon the number of methylol radicals.

2. A composition of claim 1 wherein the free formaldehyde content is 3.0–10.0 weight percent thereof.

3. The composition of claim 1 wherein the hemiformal of bis(4-hydroxy-3,5-dihydroxymethylphenyl)methane is the di-hemiformal and X is 2.

4. A process for preparing a stable high efficiency single phase aqueous phenol-formaldehyde resin which process consists of reacting 2.0–3.2 mols of formaldehyde per mol of phenol at reflux condition in the presence of at least 5 parts of a basic catalyst per 100 parts of phenol, continuing the reaction to an end point of less than 5 weight percent of free phenol based on the weight of resin solids and a pH of 6.8–8.2 and then adding thereto sufficient formaldehyde to adjust the free formaldehyde content to at least 3.0 weight percent based on the weight of resin solids; said resin having contained therein in equilibrium formaldehyde, bis(4-hydroxy-3,5-dihydroxymethylphenyl)methane and at least the monohemiformal of bis(4-hydroxy-3,5-dihydroxymethylphen-yl)methane as set forth in the following chemical equation:

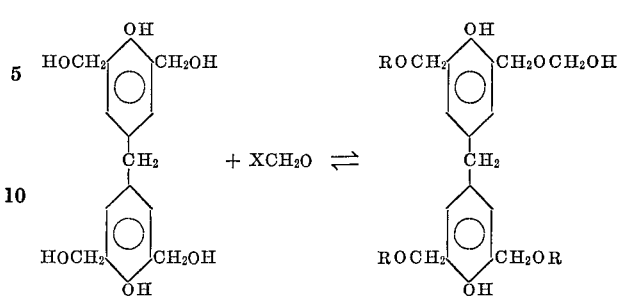

wherein R is independently selected from the group consisting of hydrogen and the methylol radical —$CH_2OH$ and X is an integer from 1–4 depending upon the number of methylol radicals.

5. The process of claim 4 wherein the free formaldehyde is adjusted to 3.0–10.0 weight percent.

6. The process of claim 4 wherein the parts of basic catalyst is 5–15 parts per 100 parts of phenol.

References Cited

UNITED STATES PATENTS

| | | | |
|---|---|---|---|
| 2,190,672 | 2/1940 | Meharg | 260—29.3 |
| 2,362,274 | 11/1944 | Hurst | 260—29.3 |
| 2,988,536 | 6/1961 | Hine et al. | 260—29.3 |
| 3,025,255 | 3/1962 | Lambuth | 260—29.3 |

MURRAY TILLMAN, *Primary Examiner.*

J. C. BLEUTGE, *Assistant Examiner.*

U.S. Cl. X.R.

260—57